(12) United States Patent
Alban et al.

(10) Patent No.: US 10,718,352 B2
(45) Date of Patent: Jul. 21, 2020

(54) MULTI-CELLULAR ABRADABLE LINER

(71) Applicant: Rolls-Royce Corporation, Indianapolis, IN (US)

(72) Inventors: Cory Alban, Avon, IN (US); Benjamin Lagow, Brownsburg, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 997 days.

(21) Appl. No.: 15/219,692

(22) Filed: Jul. 26, 2016

(65) Prior Publication Data
US 2018/0031000 A1 Feb. 1, 2018

(51) Int. Cl.
*F04D 29/52* (2006.01)
*F02C 3/04* (2006.01)
*F04D 29/02* (2006.01)
*F01D 11/12* (2006.01)

(52) U.S. Cl.
CPC .......... *F04D 29/526* (2013.01); *F01D 11/122* (2013.01); *F01D 11/127* (2013.01); *F02C 3/04* (2013.01); *F04D 29/023* (2013.01); *F05D 2220/32* (2013.01); *F05D 2230/30* (2013.01); *F05D 2250/283* (2013.01)

(58) Field of Classification Search
CPC .... F04D 29/526; F01D 11/127; F01D 11/122; Y10T 29/49703; Y10T 29/49719; Y10T 29/49728
See application file for complete search history.

(56) References Cited

U.S. PATENT DOCUMENTS

| | | | |
|---|---|---|---|
| 4,235,303 A | 11/1980 | Dhoore et al. | |
| 6,652,226 B2 | 11/2003 | Albrecht, Jr. et al. | |
| 6,887,528 B2 * | 5/2005 | Lau | C23C 4/01 |
| | | | 427/448 |
| 7,029,232 B2 * | 4/2006 | Tuffs | F01D 11/127 |
| | | | 415/173.1 |
| 8,464,831 B2 | 6/2013 | Olander et al. | |
| 8,702,378 B2 | 4/2014 | Foster | |
| 8,973,808 B2 | 3/2015 | Lin et al. | |
| 9,097,139 B2 | 8/2015 | McMillan | |
| 9,169,045 B2 | 10/2015 | Clark | |
| 9,310,079 B2 | 4/2016 | Uskert | |
| 2012/0248708 A1 * | 10/2012 | Pattinson | B23K 26/206 |
| | | | 277/415 |
| 2013/0223977 A1 | 8/2013 | Ali | |
| 2014/0356142 A1 | 12/2014 | Arikawa et al. | |
| 2015/0337684 A1 | 11/2015 | Topol et al. | |
| 2016/0208926 A1 * | 7/2016 | Davis | F02C 7/28 |

FOREIGN PATENT DOCUMENTS

WO 9521319 A1 8/1995

* cited by examiner

*Primary Examiner* — Jason L Vaughan
*Assistant Examiner* — Amanda Kreiling
(74) *Attorney, Agent, or Firm* — Barnes & Thornburg LLP

(57) ABSTRACT

A seal runner adapted for use in a knife seal in a gas turbine engine is disclosed. The seal runner illustratively includes an abradable liner.

18 Claims, 3 Drawing Sheets

MULTI-CELLULAR ABRADABLE LINER

FIELD OF THE DISCLOSURE

The present disclosure relates generally to gas turbine engines, and more specifically to seal runners of gas turbine engine components.

BACKGROUND

Gas turbine engines can power aircraft, watercraft, power generators, and the like. Gas turbine engines typically include a compressor, a combustor, and a turbine. The compressor compresses air drawn into the engine and delivers high-pressure air to the combustor. In the combustor, fuel is mixed with the high-pressure air and is ignited. Products of the combustion reaction in the combustor are directed into the turbine where work is extracted to drive the compressor and, usually, an output rotor or fan. Leftover products of the combustion are exhausted out of the turbine and may provide thrust in some applications.

Rotating gas turbine engine components such as compressor blades, turbine blades, and knife seal runners spin at high speeds. Many of these rotating components are mounted in close proximity to static components such that the components may come into contact during rotation. Abradable liners may be used at the interface of these rotating and static components within gas turbine engines to reduce wear and improve engine life and efficiency.

SUMMARY

The present disclosure may comprise one or more of the following features and combinations thereof.

A method of making a seal runner for a gas turbine engine may include solidifying sequential layers of a feedstock to build up an integrated abradable liner. In some embodiments, the abradable liner extends at least partway around a central axis and has an integral set of abradable liner features. The integral set of abradable liner features may include a web defining individual cells in a tessellated 2D or 3D pattern and a first faceplate that defines a flat axial boundary of the abradable liner along substantially all of a forward or aft side of the abradable liner so that the faceplate(s) reduces windage pressure loss associated with interaction of gasses moving along or around the seal runner.

In some embodiments, the step of solidifying the feedstock is selected from the group consisting of powder bed fusion, screen printing, laser metal deposition, and electron beam deposition. In some embodiments, the feedstock is selected from the group consisting of a metal, a ceramic, a polymer, and mixtures and combinations thereof.

In some embodiments, the abradable liner further includes a second faceplate spaced-apart from the first faceplate to locate the web therebetween, the second faceplate defining another flat axial boundary of the abradable liner.

In some embodiments, each cell extends from a facing radially-outwardly side of the abradable liner towards a facing radially-inwardly side of the abradable liner. In some embodiments, the web includes a plurality of web walls having an axial thickness that is substantially equal to an axial thickness of the first faceplate. In some embodiments, portions of the first faceplate bound cells opening radially-inwardly of the web and no portion of the first faceplate overlaps with the web walls.

In some embodiments, a plurality of web walls cooperate to define the cells and the web walls extend from the facing radially-outwardly side of the abradable liner to the facing radially-inwardly side of the abradable liner. In some embodiments, wherein each cell is formed to include a cell aperture located along the facing radially-inwardly side of the abradable liner that opens into the cell. In some embodiments, each cell extends from a backing plate through the web to the cell aperture.

In some embodiments, each cell has a generally hexagonal shape when viewed outwardly in a radial direction from the central axis. In some other embodiments, each cell has a generally diamond shaped when viewed outwardly in a radial direction from the central axis.

In some embodiments, the method may further include coupling a backing plate to the abradable liner. In some embodiments, the step of coupling the backing plate to the abradable liner includes brazing along a surface facing radially-inwardly of the backing plate to the abradable liner. In some embodiments, a first face of the backing plate is coplanar with an axially facing surface included in the first faceplate of the abradable liner.

According to another aspect of the present disclosure, a gas turbine engine assembly may include a rotor, a knife ring, and an integrated abradable liner. The rotor may be adapted to rotate about a central axis. The knife ring may be mounted for rotation with the rotor, or integral to the rotor. The integrated abradable liner extends at least partway around the central axis. The integrated abradable liner may include a web and a first faceplate. The web may define individual cells in a tessellated 2D or 3D pattern. The first faceplate may define a flat axial boundary of the abradable liner so that the first faceplate reduces windage pressure loss from direct interaction of gasses moving along moving along with, or circumferentially around, the central axis around the web.

In some embodiments, the abradable liner may further include a second faceplate spaced-apart from the first faceplate to locate the web therebetween. In some embodiments, the second faceplate defines another flat axial boundary of the abradable liner.

In some embodiments, the web includes a plurality of web walls having an axial thickness that is substantially equal to an axial thickness of the first faceplate. In some embodiments, portions of the first faceplate bound cells opening radially-inwardly included in the web.

According to another aspect of the present disclosure, method for forming an abradable liner for a gas turbine engine may include sintering a feedstock to form a set of integral abradable liner features. The abradable liner may extend at least partway around a central axis. The abradable liner may include a web, a first faceplate that defines a first flat axial boundary of the abradable liner, and a second faceplate that defines a second flat axial boundary of the abradable liner and cooperates with the first faceplate to locate the web therebetween so that windage pressure loss from direct interaction of gasses moving along with, or circumferentially around, the central axis.

In some embodiments, the web includes a plurality of web walls having an axial thickness that is substantially equal to an axial thickness of the first faceplate. In some embodiments, portions of the first faceplate bound cells opening radially-inwardly included in the web and no portion of the first faceplate overlaps with the web walls.

These and other features of the present disclosure will become more apparent from the following description of the illustrative embodiments.

DETAILED DESCRIPTION OF THE DRAWINGS

Figure 1:
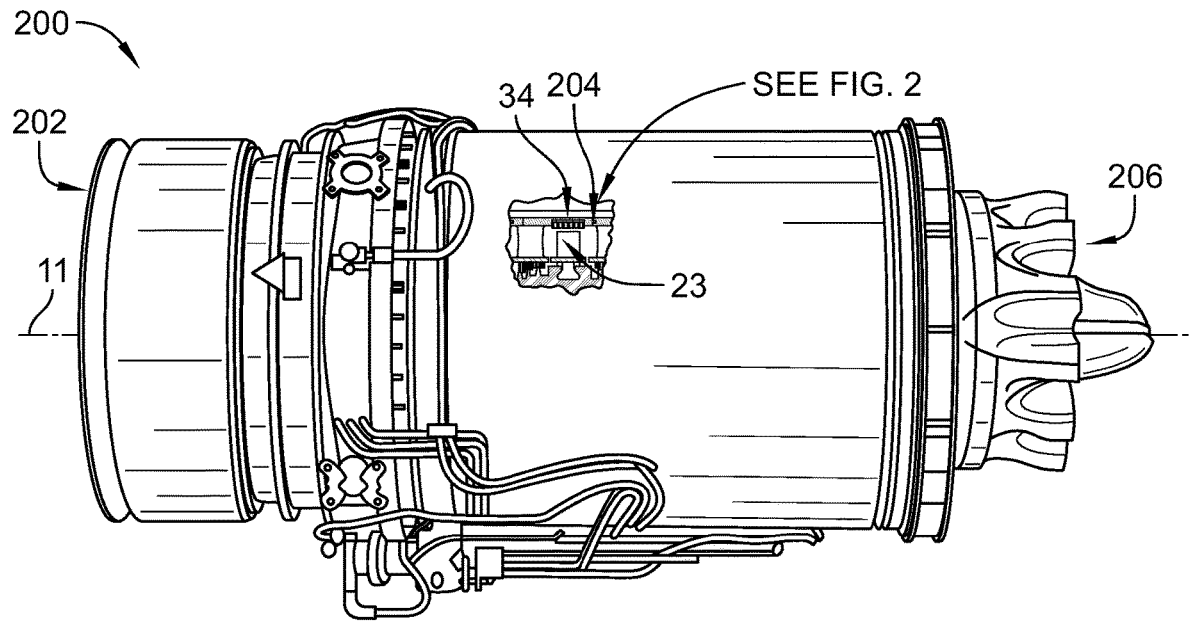
FIG. 1 is a side elevation view of a gas turbine engine in accordance with the present disclosure cut away to show a knife seal included in a compressor section of the engine used to block gasses from passing over sealing features and airfoils included in the compressor.

For the purposes of promoting an understanding of the principles of the disclosure, reference will now be made to a number of illustrative embodiments illustrated in the drawings and specific language will be used to describe the same.

Figure 2:
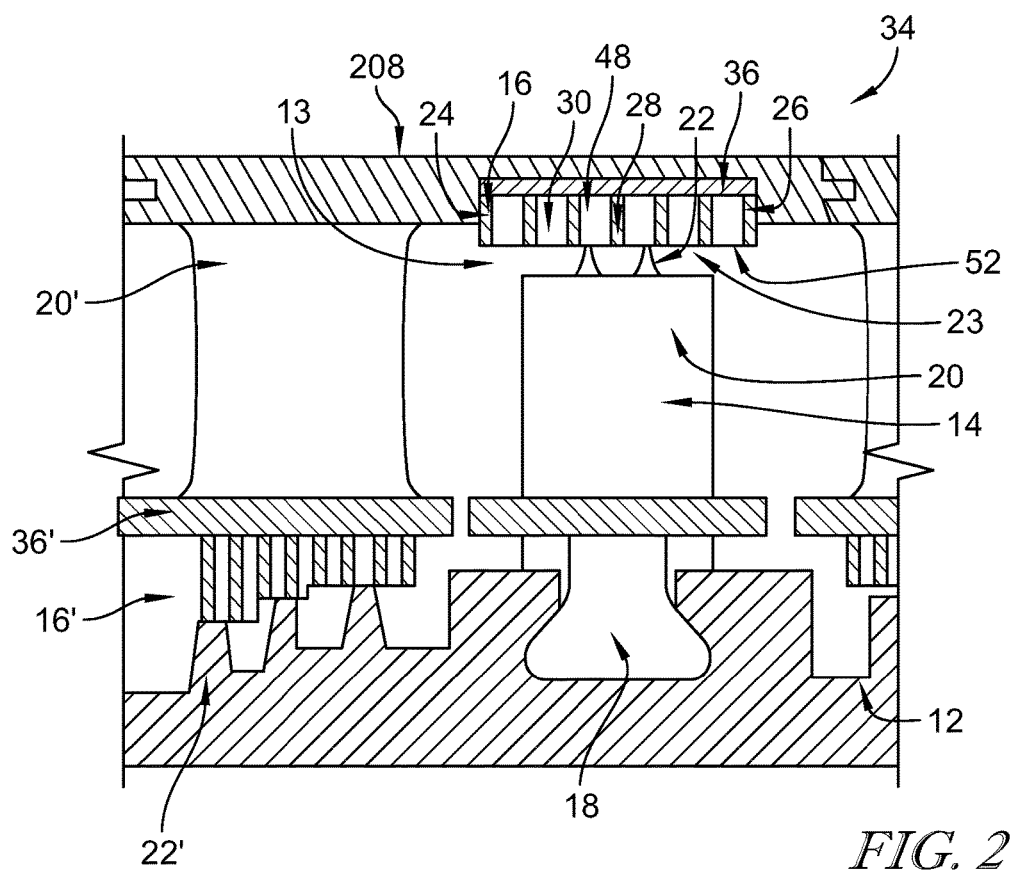
FIG. 2 is a detail view of the portion of the compressor exposed in FIG. 1 showing that the knife seal includes knives that extend from the airfoils and rotors of the compressor and a seal runner that extends around the knives.

Rotating components of gas turbine engines 200 interact with gasses passing along a gas path 13 during operation of the gas turbine engine 200. To prevent air from bypassing the rotating components, gas turbine engines 200 include seals that resist air bypassing the rotating components. Knife seals, like knife seal 23 shown in FIGS. 1 and 2, are one type of seal used in gas turbine engines 200. Knife seals 23 may include knives 22 and seal runners 34 that are contacted by knives 22.

Seal runners 34 can include abradable liners 16 that extend radially-inwardly into the gas path 13 at the interface of the seal runners 34 with knives 22 to reduce wear on other parts of the gas turbine engine 200. To reduce windage pressure loss associated with interaction of gasses moving along the gas path 13, the abradable liner 16 includes an integrated first faceplate 24 that defines a flat axial boundary of the abradable liner 16 along substantially all of a forward or aft side of the abradable liner 16.

An illustrative gas turbine engine 200 includes an inlet 202, a compressor 204, and an exhaust 206 as shown in FIG. 1. The inlet 202 is configured to receive gas from an atmosphere to be combusted in the gas turbine engine 200. The compressor 204 compresses the air received through the inlet 202. The compressed air is mixed with fuel in a combustor and is ignited to form hot gas products that exit the gas turbine engine 200 through the exhaust 206.

The compressor 204 includes a shaft 12, sometimes called a rotor 12, an airfoil 14, and a seal runner 34 that cooperates with the knives 22 extending from airfoils 14 to form the knife seal 23 as shown in FIG. 2. The rotor 12 extends along central axis 11 of the gas turbine engine 200. The airfoil 14 extends into a gas path 13 and is mounted for rotation with the rotor 12. The seal runner 34 extends circumferentially around the airfoil 14 and is spaced-apart radially from the rotor 12. The seal runner 34 extends radially-inwardly towards the airfoil 14 from a case 208 into the gas path 13 to force air to interact with the airfoil 14.

The airfoil 14 includes a root 18, a blade 20, and knives 22 as shown in FIG. 2. The root 18 couples the airfoil 14 to the rotor 12. The blade 20 extends radially-outwardly away from the root 18 towards the seal runner 34. The knives 22 are located at a tip of the blade 20. The knives 22 cooperate with the abradable liner 16 to form a knife seal 23 to minimize air bypassing the blade 20. During normal operation of the gas turbine engine 200, the knives 22 may come in contact with the abradable liner 16. The proximity between the knives 22 and the abradable liner 16 effectively seals airflow in the gas turbine engine 200.

Figure 6:
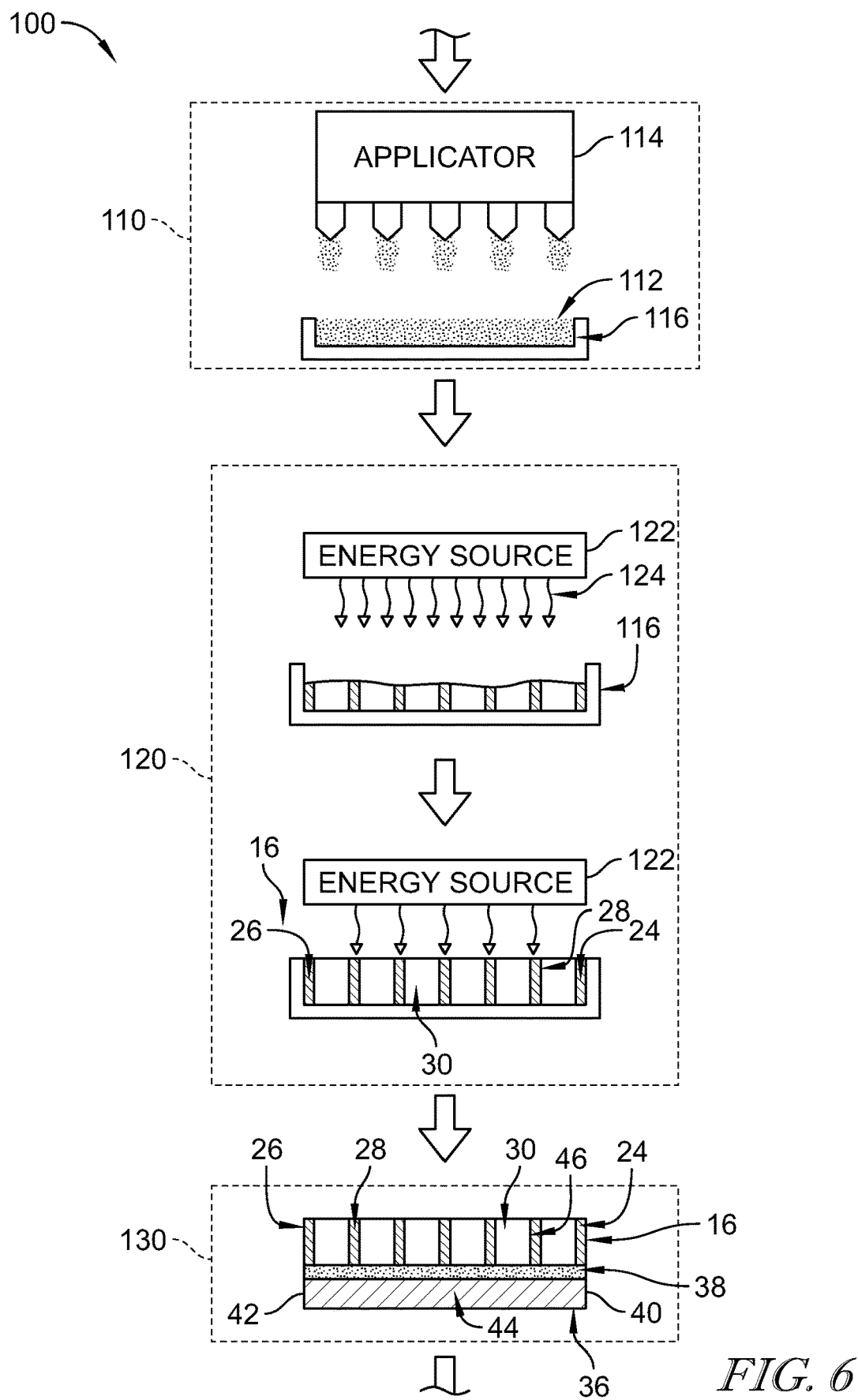
FIG. 6 is a diagrammatic illustration of a method of forming a multi-cellular abradable liner for a gas turbine engine.

The seal runner 34 includes the abradable liner 16, a backing plate 36, and braze 38 as shown in FIGS. 1, 2, and 6. The abradable liner 16 extends at least partway, and illustratively all the way, around the central axis 11. The backing plate 36 couples the abradable liner 16 to a case 208 that extends circumferentially around the compressor 204. The braze 38 extends between and interconnects the abradable liner 16 with the backing plate 36.

Figure 3:
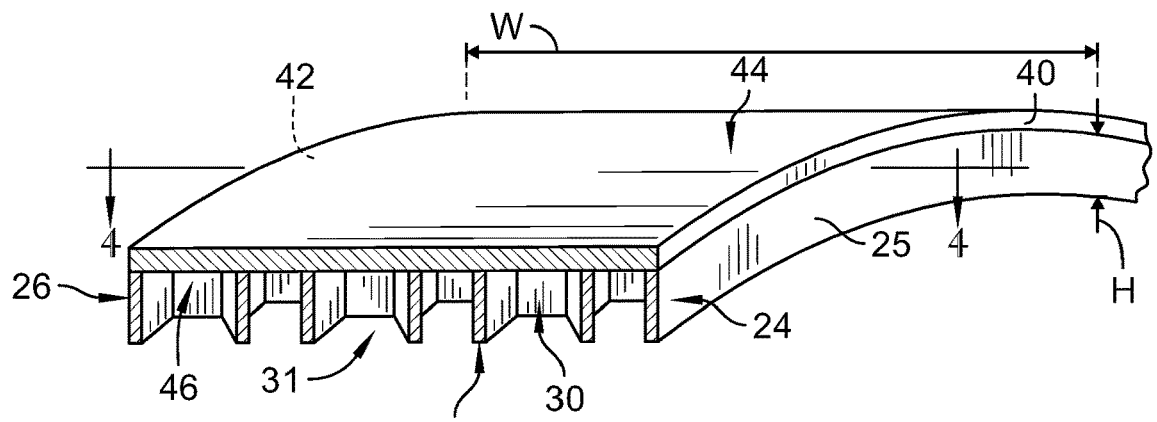
FIG. 3 is a perspective view of a portion of the seal runner of FIGS. 1 and 2 showing that the seal runner includes a backing plate and an abradable liner coupled to the backing plate, the abradable liner extending into a gas path and including from left to right a first faceplate, a multi-cellular web, and a second faceplate, and further showing the multi-cellular web defines a plurality of cells opening radially-inwardly that extend from the backing plate towards a facing radially-inwardly side of the abradable liner.
Figure 4:
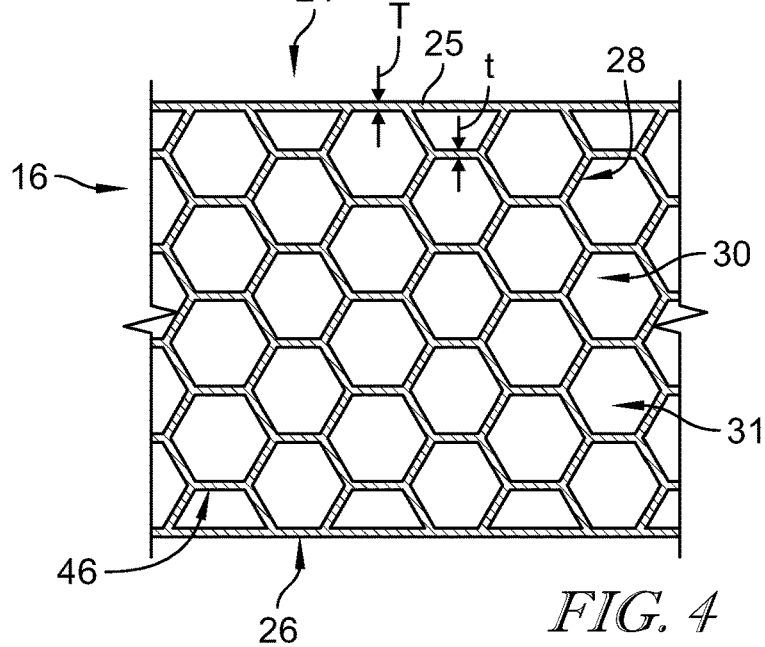
FIG. 4 is a sectional view taken along line 4-4 in FIG. 3 showing the multi-cellular web includes a plurality of web walls that cooperate to define hexagonal shaped cells opening radially-inwardly and further showing that portions of the first faceplate bound cells opening radially-inwardly and no portion of the first faceplate overlaps with the web walls.

The abradable liner 16, sometimes called an integrally-formed abradable liner 16, is a fully integrated component and is formed to include a first faceplate 24, a second faceplate 26, and a multi-cellular web 28 as shown in FIGS. 2-5. The first faceplate 24, the second faceplate 26, and the multi-cellular web 28 cooperate to form a portion of the seal runner 34. The first faceplate 24 is arranged to define a flat axial boundary of the abradable liner 16 along substantially all of a forward or aft side of the abradable liner 16. The first faceplate 24 has an axial thickness T as shown in FIG. 4. The second faceplate 26 is located spaced-apart axially from the first faceplate 24 and forms another flat axial boundary of the abradable liner 16. The multi-cellular web 28 extends between and interconnects the first faceplate 24 and the second faceplate 26. In some embodiments, the abradable liner 16 includes the multi-cellular web 28 and either only the first faceplate 24 or only the second faceplate 26.

The backing plate 36 includes a first face 40, a second face 42, and a body 44 as shown in FIGS. 2 and 3. The first face 40 is coplanar with a facing axial surface 25 of the first faceplate 24 of the abradable liner 16. The second face 42 is coplanar with a facing axial surface 25 of the second faceplate 26. The body 44 is arranged to overlie the multi-cellular web 28. The web walls 46 have an axial thickness t as shown in FIG. 4. The first face 40, the second face 42, and the body 44 cooperate to couple the abradable liner 16 to the gas turbine engine 200.

The multi-cellular web 28 includes a plurality of web walls 46 that define a plurality of cells opening radially-inwardly 30 as shown in FIGS. 2-4. The web walls 46 extend axially between the first faceplate 24 and the second faceplate 26. Each cell 30 of the plurality of cells opening radially-inwardly 30 extends from a facing radially-outwardly side 48 of the abradable liner 16 towards a facing radially-inwardly side 52 of the abradable liner 16. Each cell 30 of the plurality of cells opening radially-inwardly 30 is formed to include a cell aperture 31 that opens into the cell 30 on the facing radially-inwardly side 52. In some embodiments, the web walls 46 have a thickness and the first faceplate 24 has a substantially equal thickness. In some embodiments, the plurality of cells 30 open radially-outwardly. In some embodiments, the plurality of cells 30 face an interior wall coupled to the web walls 46.

In some embodiments, the web walls 46 are formed with the first faceplate 24 and the second faceplate 26 so the web walls 46 and the first and second faceplates 24, 26 are integral with one another and are part of a single-piece or monolithic component not made up of multiple assembled components, as shown in FIGS. 2-4 and 6. In the illustrative embodiment, portions of the first faceplate 24 bound a cell 30 of the plurality of cells opening radially-inwardly 30 and no portion of the first faceplate 24 overlaps with the web walls 46 as shown in FIGS. 2-4.

The abradable liner 16 has an axial width W defined as the axial distance from the outwardly facing surfaces of the first faceplate 24 and the second faceplate 26 as shown in FIG. 3. In some embodiments, the backing plate 36 has generally the same width W. The abradable liner 16 has a radial height H defined as the radial distance from the facing radially-inwardly side 52 to the facing radially-outwardly side 48. In some embodiments, the radial height H may change over the axial width W.

Each cell 30 of the plurality of cells opening radially-inwardly 30 can be formed to a shape appropriate for the application in the gas turbine engine 200. In some embodiments, each cell 30 has a generally hexagonal shape when viewed outwardly in a radial direction from the central axis 11, as shown in FIG. 4. In accordance with the present disclosure, other suitable cell shapes are envisioned. For example, 3-dimensional shapes are contemplated and may be created by the methods disclosed herein.

In some embodiments, an abradable liner 16' is coupled to a backing plate 36' on a stationary vane 20' as shown in FIG. 2. The knives 22' are configured to rotate with the rotor 12 or shaft 12. Illustratively, each of the knives 22' may extend radially-outwardly from the rotor 12 or shaft 12 discrete distances, as shown in FIG. 2. The abradable liner 16' may have a set of discrete axial heights to cooperate with the knives 22' to form the knife seal.

Figure 5:
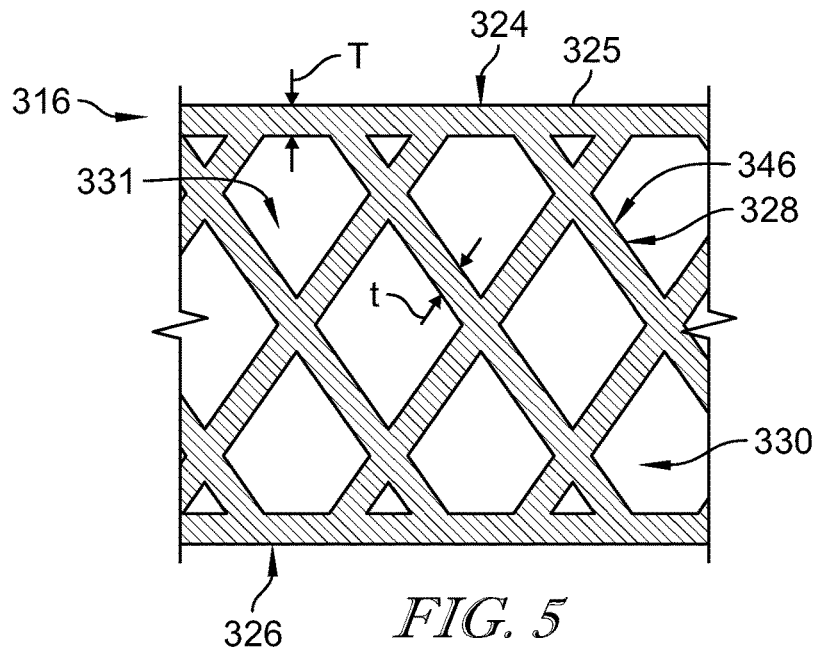
FIG. 5 is a sectional view of another embodiment of an abradable liner showing the multi-cellular web includes a plurality of web walls that cooperate to define diamond shaped cells opening radially-inwardly and further showing that portions of the first faceplate bound cells opening radially-inwardly and no portion of the first faceplate overlaps with the web walls.

Another illustrative abradable liner 316 adapted for use in a gas turbine engine 200 is shown in FIG. 5. The abradable liner 316 is substantially similar to the abradable liner 16 shown in FIGS. 1-4 and described herein. Accordingly, similar reference numbers in the 300 series indicate features that are common between the abradable liner 16 and the abradable liner 316. The description of the abradable liner 16 is hereby incorporated by reference to apply to the abradable liner 316, except in instances when it conflicts with the specific description and drawings of the abradable liner 316.

The abradable liner 316 includes a first faceplate 324, a second faceplate 326, and a multi-cellular web 328 as shown in FIG. 5. The first faceplate 324, the second faceplate 326, and the multi-cellular web 328 cooperate to form a portion of the seal runner 34. The first faceplate 324 is arranged to define a flat axial boundary of the abradable liner 316 along substantially all of a forward or aft side of the abradable liner 316. The first faceplate 24 has an axial thickness T as shown in FIG. 5. The second faceplate 326 is located spaced-apart axially from the first faceplate 324 and forms another flat axial boundary of the abradable liner 316. The multi-cellular web 328 extends between and interconnects the first faceplate 324 and the second faceplate 26. In some embodiments, the abradable liner 316 includes the first faceplate 324 and the multi-cellular web 328. In some embodiments, the first faceplate 324 includes a flat facing axial surface 325.

The multi-cellular web 328 includes a plurality of web walls 346 that define a plurality of cells opening radially-inwardly 330 as shown in FIG. 5. The web walls 346 extend axially between the first faceplate 324 and the second faceplate 326. The web walls 346 have an axial thickness t as shown in FIG. 4. The Each cell 330 of the plurality of cells opening radially-inwardly 330 extends from a facing radially-outwardly side of the abradable liner 316 towards a facing radially-inwardly side of the abradable liner 316. Each cell 330 of the plurality of cells opening radially-inwardly 330 is formed to include a cell aperture 331 on the facing radially-inwardly side that opens into the cell 330. In some embodiments, the web walls 346 have a thickness and the first faceplate 324 has a substantially equal thickness.

In some embodiments, the web walls 346 are formed with the first faceplate 324 and the second faceplate 326 so the web walls 346 and the first and second faceplates 324, 326 are integral with one another and are part of a single-piece or monolithic component not made up of multiple assembled components, as shown in FIG. 5. In an illustrative embodiment, portions of the first faceplate 324 bound a cell 330 of the plurality of cells opening radially-inwardly 330 and no portion of the first faceplate 324 overlaps with the web walls 346 as shown in FIG. 5.

Each cell 330 of the plurality of cells opening radially-inwardly 30 can be formed to a shape appropriate for the application in the gas turbine engine 200. In some other embodiments, the cells 330 may have a generally diamond shape when viewed outwardly in a radial direction from the central axis 11 as shown in FIG. 5.

The abradable liners 16, 316 comprise an abradable material suitable for use in the gas turbine engine 200. In some embodiments, the abradable material may be a metal, a ceramic, a polymer, and mixtures and combinations thereof. Exemplary metals include alloys nickel, cobalt, and mixtures and combinations thereof. Exemplary alloys include austenitic stainless steel and superalloys such as nickel superalloys, cobalt superalloys, and any suitable alternative thereof. Exemplary ceramics include ceramic oxides and any suitable alternative thereof. In some embodiments, the abradable material may be a solution treated nickel superalloy such as Hastelloy® X, available from Haynes International Inc. In some embodiments, the abradable material may be a cobalt superalloy such as Haynes® 25 available from Haynes International Inc. In some embodiments, the abradable material may be any material suitable for additive manufacturing.

A method 100 of making a portion of a seal runner 34 is shown in FIG. 6. The method 100 includes the steps of providing 110 a feedstock 112, solidifying 120 the feedstock 112 to form sequential layers of the abradable liner 16, and brazing 130 the abradable liner 16 to the backing plate 36 as shown in FIG. 6 to form the portion of the seal runner 34. The method 100 may further include installing the portion of the seal runner 34 adjacent the knives 22 in the gas turbine engine 200. When an airfoil 14 rotates, the knives 22 may cut into the abradable liner 16 to form the knife seal 23 as shown in FIG. 2.

In an example, the step of providing 110 the feedstock 112 includes dispensing the feedstock 112 with an applicator 114 onto a tray 116 as shown in FIG. 6. The feedstock 112 may be a metal, a ceramic, a polymer, and mixtures and combinations thereof. Exemplary metals include alloys nickel, cobalt, and mixtures and combinations thereof. Exemplary alloys include austenitic stainless steel and superalloys such as nickel superalloys, cobalt superalloys, and any suitable alternative thereof. Exemplary ceramics include ceramic oxides and any suitable alternative thereof. In some embodiments, the feedstock 112 may be a solution treated nickel superalloy such as Hastelloy® X, available from Haynes International Inc. In some embodiments, the feedstock 112 may be a cobalt superalloy such as Haynes® 25 available from Haynes International Inc. In some embodiments, the feedstock 112 may be any material suitable for additive manufacturing.

In an example, the step of solidifying 120 the feedstock 112 includes applying directed energy beams, illustratively via a laser, or an energy beam 124 to the feedstock 112 as shown in FIG. 6. In an illustrative embodiment, the step of solidifying 120 may include a sub-step in which energy is applied by the directed energy 122 across all of the feedstock 112 to heat all of the feedstock 112. Illustratively, the step of solidifying 120 may also include a sub-step in which energy is applied to a portion of the feedstock 112 to create differing levels of patterned sintering. Varying the power of the directed energy 122 and/or the raster pattern of the directed energy 122 may produce differing levels of sintering and/or heat treating may be achieved.

Exemplary techniques in accordance with the present disclosure for solidifying 120 the feedstock 112 include powder bed fusion, screen printing, laser powder deposition, electron beam deposition, or any suitable alternative. Illustrative powder bed fusion techniques include heat sintering, selective laser sintering, direct metal laser sintering, selective laser melting, and electron beam melting. Illustrative powder laser metal deposition techniques include blown powder deposition. In some embodiments, the step of solidifying 120 the feedstock is performed directly on the backing plate 36 or any suitable seal runner 34 or knife seal 23 components.

In some embodiments, the feedstock 112 is a powder bed. In some embodiments, the feedstock 112 is a blown powder. In some embodiments, the feedstock 112 is formed as a screen. In some embodiments, the feedstock 112 is a wire. The feedstock 112 may be heated using the directed energy 122 any number of times to create a predetermined pattern and to solidify sequential layers of the feedstock 112 as shown in FIG. 6. The sequential layers form an integral set of abradable liner features, such as the first faceplate 24, 324, the second faceplate 26, 326, and the multi-cellular web 28, 328. Building sequentially the layers that form the integrated abradable liner 16, 316 allows some of the features to be integral with one-another.

In an example, the step of brazing 130 the abradable liner 16 to the backing plate 36 forms a portion of the seal runner 34 as shown in FIG. 6. The step of brazing 130 includes applying a braze material 38 to the abradable liner 16. In some embodiments, the braze material 38 is applied along a surface facing radially-inwardly of the backing plate 36. The step of brazing 130 also includes aligning the first face 40 of the backing plate 36 with the facing axial surface 25 of the first faceplate 24 of the abradable liner 16. The step of brazing 130 also includes heating the aligned backing plate 36 and abradable liner 16 to braze the backing plate 36 with the abradable liner 16.

In applications like those described herein, abradable seal material may be honeycomb or feltmetal. Honeycomb can have a hexagonal structure, which is made by crimping and spot welding sheet metal, whereas feltmetal can be made of sintered metallic whiskers. In most applications, both honeycomb and feltmetal can be made of Hastelloy® X, which is usable to ~1000° C., but other materials are available and can be used in suitable circumstances. In both cases, the abradable seal is brazed directly to a seal carrier (e.g. the backing plate 36) or to the diameter of a component (e.g. the case 208). Because of its manufacturing method, the forward and aft faces of honeycomb are not flat, but rather reflect the crimped geometry of the sheet metal. In contrast, feltmetal is produced in large sheets and the liner is cut out and rolled.

Honeycomb structures can be very useful for abradable liners due to their structural rigidity and ease of cutting by knives or other rotating components. These structures may be produced by crimping sheet metal and spot welding it. Because of this, the forward and aft faces of the abradable have crimped geometry. When windage flow impinges on this geometry, it can experience a pressure loss and temperature rise. This can lower the momentum of the flow and, when it is re-injected into the flow path, can cause more stator pressure loss. The overall result can be an increases exit temperature with a lowered exit pressure (thus lowered efficiency.) Computational fluid dynamics suggest that this may have a significant effect on engine performance.

Abradable liners (e.g. the abradable liner 16, 316) produced by additive manufacturing processes (e.g. the method 100) can be produced with flat forward and/or aft faces (e.g. the first faceplate 24, 324 and the second faceplate 26, 326). This can be done for deposited abradables of any cell geometry. The flat faces (e.g. the facing axial surface 25 of the first faceplate 24, 324) can give a net benefit to performance relative to conventionally produced materials, which tend to have forward and aft surfaces (e.g. the first faceplate 24, 324 and the second faceplate 26, 326) that replicate the cell geometry. One potential benefit of the flat face (e.g. the facing axial surface 25, 325 of the first faceplate 24, 324) is that it avoids the windage pressure loss observed on some other geometries. Because of the nature of additive manufacturing, it may be possible to include this feature in any abradable liner (e.g. the abradable liner 16, 316) produced by an additive manufacturing method (e.g. the method 100). This can produce a net benefit to performance for any structure, cell geometry (if applicable), or material.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method of making a seal runner for a gas turbine engine, the method comprising
solidifying sequential layers of a feedstock to build up an integrated abradable liner,
coupling a backing plate to the abradable liner by brazing along a surface facing radially-inwardly of the backing plate to the abradable liner,
wherein the abradable liner extends at least partway around a central axis and has an integral set of abradable liner features that includes a web with a plurality of web walls defining a plurality of cells and a first faceplate that defines a flat axial boundary of the abradable liner along substantially all of a forward or aft side of the abradable liner and having a radial height that is equal to each wall so that the first faceplate reduces windage pressure loss associated with interaction of gasses moving along or around the seal runner.

2. The method of claim 1, wherein the step of solidifying the feedstock is selected from the group consisting of powder bed fusion, screen printing, laser metal deposition, and electron beam deposition.

3. The method of claim 2, wherein the feedstock is selected from the group consisting of a metal, a ceramic, a polymer, and mixtures and combinations thereof.

4. The method of claim 1, wherein the abradable liner further includes a second faceplate spaced-apart from the first faceplate to locate the web therebetween, the second faceplate defining another flat axial boundary of the abradable liner.

5. The method of claim 4, wherein each cell faces the central axis, opens radially-inwardly, and extends from a facing radially-outwardly side of the abradable liner towards a facing radially-inwardly side of the abradable liner.

6. The method of claim 5, wherein the plurality of web walls have an axial thickness that is substantially equal to an axial thickness of the first faceplate.

7. The method of claim 6, wherein portions of the first faceplate bound cells opening radially-inwardly of the web and no portion of the first faceplate overlaps with the web walls.

8. The method of claim 1, wherein the web walls extend from a facing radially-outwardly side of the abradable liner to a facing radially-inwardly side of the abradable liner.

9. The method of claim 8, wherein each cell is formed to include a cell aperture located along the facing radially-inwardly side of the abradable liner that opens into the cell.

10. The method of claim 9, wherein each cell extends from a backing plate through the web to the cell aperture.

11. The method of claim 10, wherein each cell has a generally hexagonal shape when viewed outwardly in a radial direction from the central axis.

12. The method of claim 10, wherein each cell has a generally diamond shaped when viewed outwardly in a radial direction from the central axis.

13. The method of claim 1, wherein a first face of the backing plate is coplanar with an axially facing surface included in the first faceplate of the abradable liner.

14. The method of claim 1, wherein the plurality of walls define a plurality of polygonal shaped cells, and wherein the plurality of polygonal shaped cells includes a first set and a second set and each polygonal shaped cell bounded by the first faceplate in the first set is smaller than each polygonal shaped cell in the second set.

15. The method of claim 14, wherein the polygonal shaped cells in the second set are hexagonal shaped cells and each cell that is bounded by the first faceplate in the first set has a trapezoidal shape.

16. A method for forming an abradable liner for a gas turbine engine, the method comprising
sintering a feedstock to form a set of integral abradable liner features,
wherein the abradable liner extends at least partway around a central axis and includes a web with a plurality of web walls defining a plurality of cells, a first faceplate that defines a first flat axial boundary of the abradable liner, and a second faceplate that defines a second flat axial boundary of the abradable liner and cooperates with the first faceplate to locate the web therebetween so that windage pressure loss from direct interaction of gasses moving along or around the central axis is reduced,
wherein the first faceplate and the second faceplate are spaced apart axially from one another to define a width of the abradable liner that is constant circumferentially about the central axis and the first face plate and the second faceplate have a radial height that is equal to the walls defining the plurality of cells so that the first faceplate, the second faceplate and, the plurality of web walls are spaced apart from the central axis by a distance that is equal across the entire width of the abradable liner.

17. The method of claim 16, wherein the plurality of web walls have an axial thickness that is substantially equal to an axial thickness of the first faceplate and portions of the first faceplate bound cells opening radially-inwardly included in the web and no portion of the first faceplate overlaps with the web walls.

18. The method of claim 16, wherein the plurality of walls are integrated with the first faceplate and the second faceplate to define the plurality of cells therebetween and the plurality of cells bounded by the first faceplate and the second faceplate include a first set and a second set and each of the plurality of cells of the first set are smaller than each of the plurality of cells of the second set.

* * * * *